United States Patent [19]

Sen

[11] Patent Number: 5,131,779

[45] Date of Patent: Jul. 21, 1992

[54] CONNECTING SHAFT ASSEMBLY FOR THE SCREEN COVER OF A PORTABLE COMPUTER

[75] Inventor: Tony Sen, Taipei, Taiwan

[73] Assignee: Crete Systems, Inc., Taipei, Taiwan

[21] Appl. No.: 531,628

[22] Filed: Jun. 1, 1990

[51] Int. Cl.⁵ ............................. F16C 11/00
[52] U.S. Cl. .............................. 403/91; 403/87; 16/342; 248/291
[58] Field of Search ............... 403/91, 87, 92; 16/342, 16/337; 248/923, 922, 921, 920, 291

[56] References Cited

U.S. PATENT DOCUMENTS 4,363,561 12/1982 Hsieh ........................ 403/92
4,489,447 12/1984 Umehara ..................... 16/342 X
4,986,507 1/1991 Chiang ....................... 403/91 X Primary Examiner—Andrew V. Kundrat
Attorney, Agent, or Firm—Bacon & Thomas

[57] ABSTRACT

A shaft assembly for connecting the screen cover of a portable computer to the computer body and permitting permits the cover to be pivoted and maintained at a desired angle of use. The assembly includes a hollow shaft provided with an expandable conical claw which is frictionally engaged within a rotatable positioning ring on which the screen cover is mounted, so that pivoting of the cover will cause the ring to rotate relative to the hollow shaft and be frictionally maintained in a given angle of rotation relative to the hollow shaft.

3 Claims, 3 Drawing Sheets

CONNECTING SHAFT ASSEMBLY FOR THE SCREEN COVER OF A PORTABLE COMPUTER

BACKGROUND OF THE INVENTION

The present invention relates to a shaft assembly for pivotably connecting the screen cover of a portable computer to the computer body, and particularly a shaft assembly which will permit the screen cover to be pivoted and maintained in any position of use in accordance with the requirements of the user.

Because of the rapid developments in both industry and business, a portable computer has become very advantageous in its capability of being conveniently operated at any location. However, because of the difference in the position in which a portable computer is used when compared to a desk top computer, and the different personal habits of different users, it is often required to adjust the angle of the computer screen cover in order to facilitate utilization of the computer and processing of data in accordance with individual requirements.

A conventional means for adjusting the screen cover of a portable computer is to utilize an adjustable locking screw for securing the screen cover in position after it has been opened to a desired angle. This is an inconvenient way of adjusting the angle of the screen cover. Moreover, it is known to provide a stepless positioning connecting shaft for the screen cover of a portable computer, but this construction requires the utilization of many components, including screws, a torsion spring and a mandrel, all of which require a considerable amount of time in assembling, maintenance and repair. This latter device is also not satisfactory since the screen cover may suddenly close due to the retraction of the spring when the user accidentally touches the cover if it is maintained at an angle of less than 90°. This situation could cause damage to the surface of the key board and loss of data entered into the screen due to the automatic shut-off of the power source, thus causing possible serious disturbance in the operation of the computer.

SUMMARY OF THE INVENTION

The main object of the invention is to provide a shaft assembly for pivotably connecting the screen cover of a portable computer and permits the screen to be quickly positioned and maintained at a given angle, thus permitting a user to conveniently operate the computer without interruption.

It is another object of the invention to provide a shaft assembly for pivotably connecting the screen cover of a portable computer to the computer body in such a manner as to facilitate the assembly, maintenance and repair of the computer through design simplification.

Other objects, features and advantages of the invention shall become apparent from the following detailed description of a preferred embodiment thereof, when considered in conjunction with the drawings wherein like reference characters refer to corresponding parts of the several views.

DETAILED DESCRIPTION OF THE PREFERRED EMBODIMENT

Figure 1:
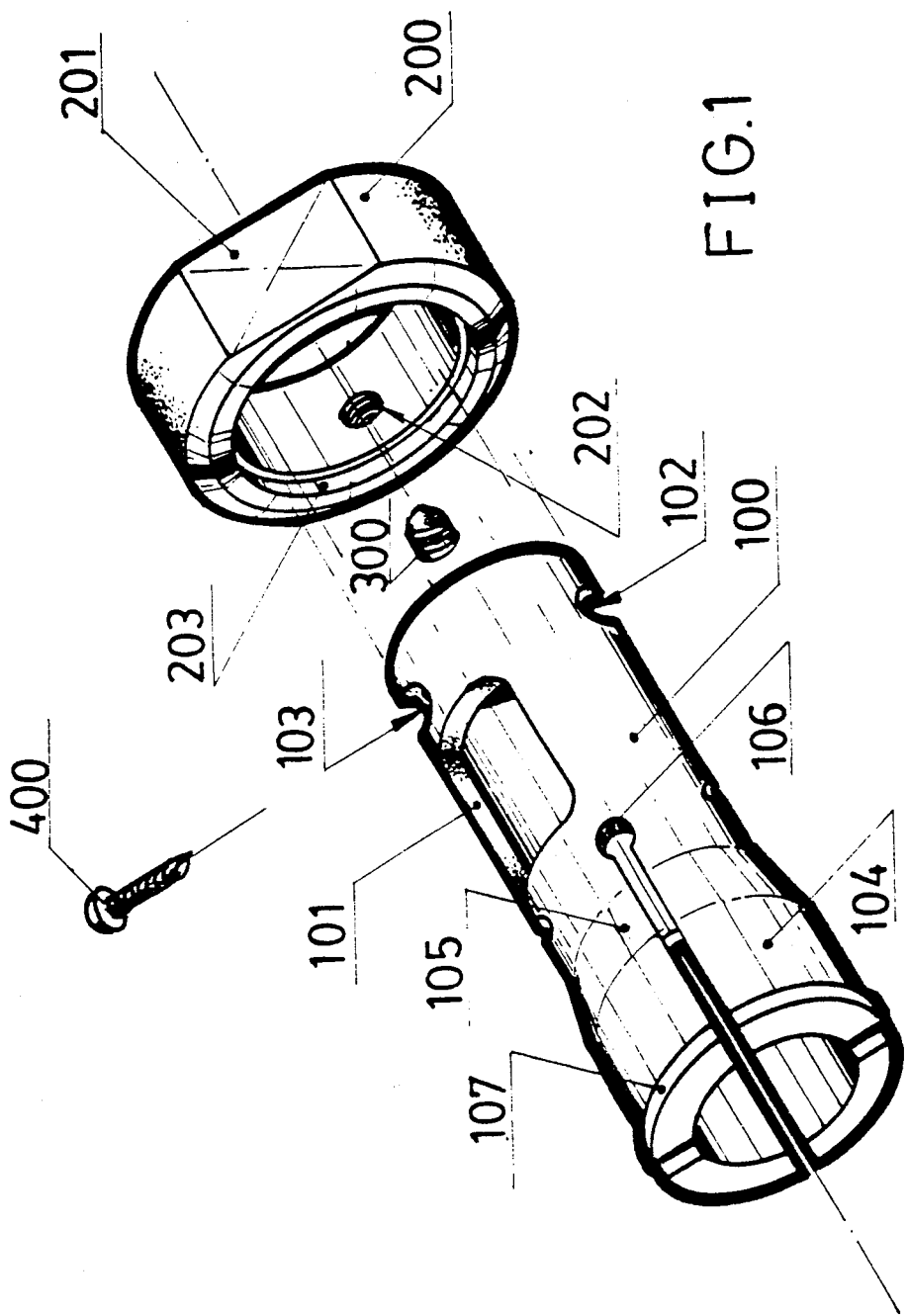
FIG. 1 is an exploded perspective view of a shaft assembly according to a preferred embodiment of the invention.

As shown in FIG. 1, a shaft assembly according to a preferred embodiment of the invention includes a wire releasing hollow shaft 100 which is engageable within a positioning ring 200. Shaft 100 is provided with a screw hole 102 and an opposed insertion hole 103 at the front end thereof. A wire releasing hole 101 of square configuration is also provided for pulling wire through shaft 100 to connect with a circuit after assembly. There is also provided a conical-shaped step surface 105 behind the wire releasing hole 101. Surface 105 extends towards the back end of shaft 100 and is provided with a plurality of longitudinally extending and circumferentially spaced slots 106 formed in the wall of shaft 100 to define an expandable conical claw 104. A flange 107 is provided on the back end of shaft 100 for engaging positioning ring 200.

The outer peripheral edge of positioning ring 200 is provided with a flat positioning plane 201 for matching with the assembling hole at the two lower side portions of a screen cover to provide a positioning function. There is provided a screw hole 202 through the sidewall of ring 200 opposite plane 201 for receiving a clearing screw 300. A circular recessed flange step 203 is provided at the back end and on the inner side of positioning ring 200. Step 203 is preferably formed with a lathe tool and corresponds in configuration with flange 107 on hollow shaft 100 for engagement therewith.

Figure 2:
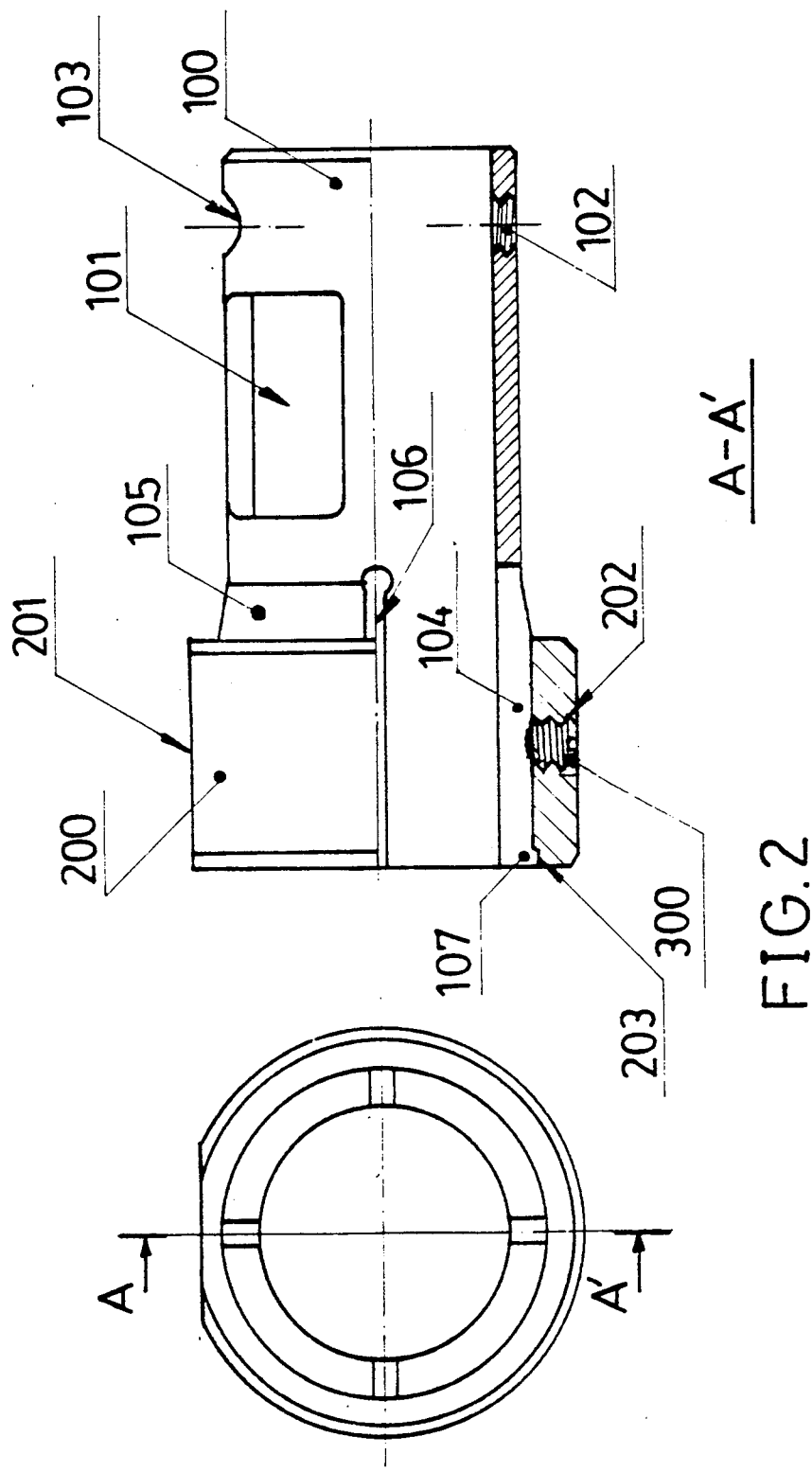
FIG. 2 is a sectional view of the shaft assembly.

With reference to FIG. 2, there is shown a sectional view of the shaft assembly of the present invention with the positioning ring 200 being engaged on the back end of hollow shaft 100. In this position, flange 07 is in engagement with flange step 203 of ring 200. This causes the inner wall of positioning ring 200 to radially compress surface 105 of claw 104 so that claw 104 is urged radially inwardly because of slots 106. This radial compression is in opposition to the tendency of claw 104 to expand outwardly, thus resulting in a frictional engagement between ring 200 and claw 104. By providing screw 300 with an arc-shaped top end, the engagement of screw 300 within screw hole 202 of ring 200 causes screw 300 to be urged against claw 104, thereby permitting the adjustment of the degree of frictional force between ring 200 and claw 104 at any time before assembly or during maintenance and repair of the shaft assembly.

Figure 3:
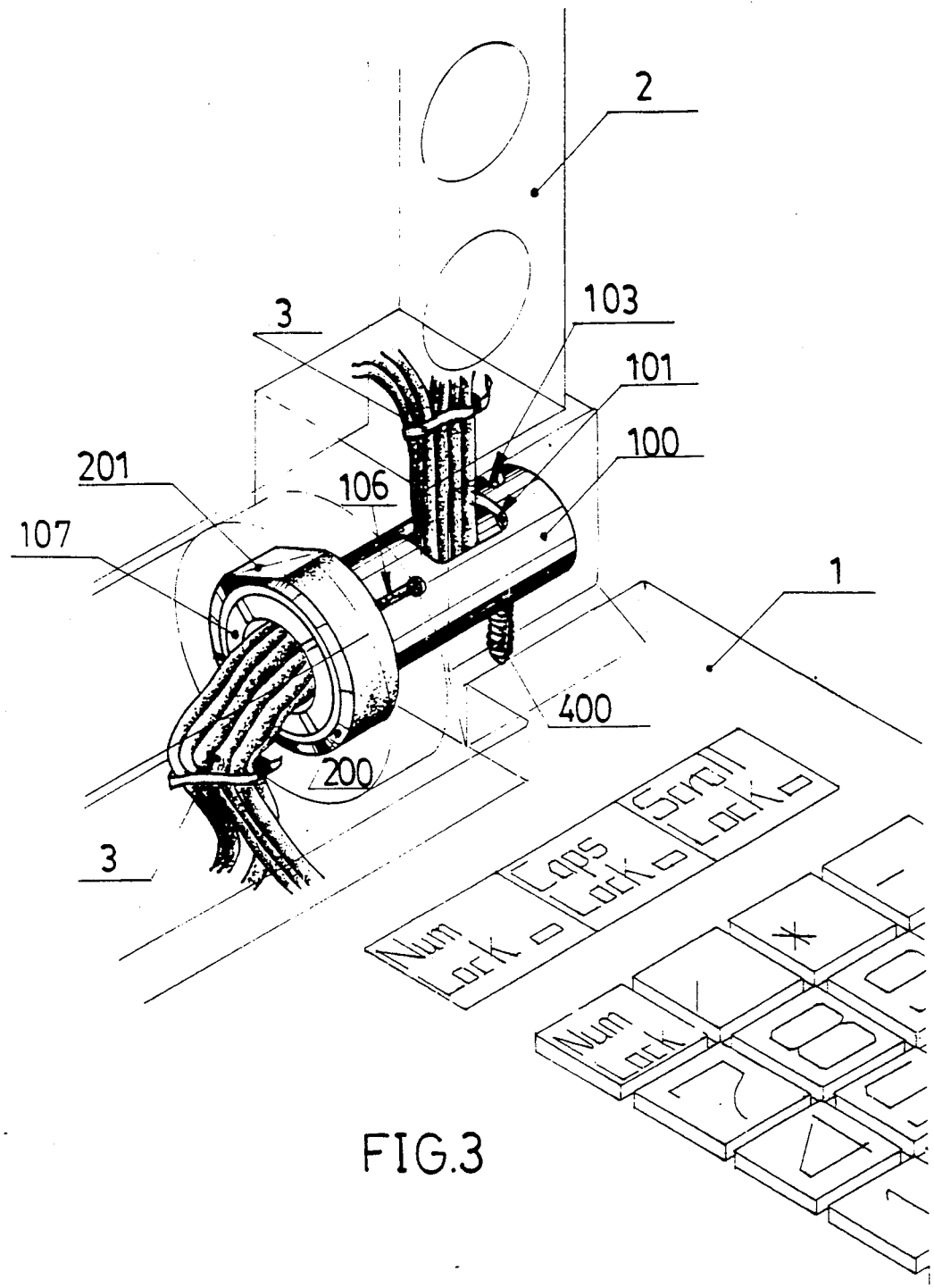
FIG. 3 is a perspective view of the shaft assembly shown installed within a portable computer.

As shown in FIG. 3, the shaft assembly is depicted installed within a portable computer, and specifically the lower portion of a screen cover 2 of the computer body. This is accomplished by first pulling a plurality of electric wires 3 through hollow shaft 100 and thereafter inserting screw 400 through holes 103 and 102 to secure the assembly in position.

When the user of computer 1 opens the screen cover 2, the plane surface 20 of the positioning ring 200 is in engagement with a matching portion of the screncover 2, so that ring 200 and cover 2 rotate relative to hollow shaft 100. During such rotation, the conical claw 104 on the back end of hollow shaft 100 is in engagement with the inner surface of ring 200 to produce a frictional force therebetween. This in turn permits ring 200 to be rotated to and maintained at a desired angle of rotation with respect to shaft 100. Since screen cover 2 is engaged with ring 200, it is therefore apparent that ring 200 serves to maintain screen cover 2 in a corresponding pivotal position determined by the user. The degree of frictional force may of course be varied by tightening or loosening screw 300. In this way, screen cover 2 is securely maintained at a desired position, thereby permitting the user of computer 1 to operate same without concern of screen cover 2 inadvertently falling down onto computer 1 if accidentally touched by the user.

Although the present invention has been described with respect to a preferred embodiment thereof, it is understood that certain modification and changes may be made by one of ordinary skill in the art without departing from the spirit of the invention or scope of the subjoined claims.

I claim:

1. A stepless shaft assembly for connecting the screen cover of a portable computer to the computer body comprising:

a) a hollow wire releasing shaft including a screw hole and an opposed inserting hole on a front end of the shaft, a wire releasing hole positioned rearwardly of the screw and inserting holes, a conical step surface formed adjacent a back end of the shaft and provided with a plurality of longitudinally extending and circumferentially spaced slots to define an expandable conical claw;

b) a positioning ring in frictional engagement around the conical claw of the hollow shaft, the ring being provided with a positioning plane surface on tis outer periphery for engaging a corresponding portion of a computer screen cover; and c) wherein rotation of the positioning ring relative to the hollow shaft permits the ring to be positioned and maintained at a desired angle of rotation relative to the hollow shaft and also maintain the screen cover in a corresponding desired position relative to the computer body.

2. The stepless shaft assembly of claim 1 wherein the back end of the hollow shaft includes a flange and the positioning ring includes a circular recessed flange step engageable with the flange of the hollow shaft when the ring is disposed in frictional engagement around the conical claw.

3. The stepless shaft assembly of claim 1 wherein the positioning ring includes an adjustment screw for varying the degree of frictional engagement between the positioning ring and the conical claw.

* * * * *